United States Patent
Zierer et al.

(10) Patent No.: US 10,843,648 B2
(45) Date of Patent: Nov. 24, 2020

(54) CRASH STRUCTURE FOR A VEHICLE

(71) Applicant: AUDI AG, Ingolstadt (DE)

(72) Inventors: Mario Zierer, Reichertshofen (DE); Thomas Hahn, Böhmfeld (DE); Matthew Clarke, Gaimersheim (DE); Anton Kaufmann, Teugn (DE); Marc Compte, Ingolstadt (DE); Markus Sandfort, Neuburg/Donau (DE)

(73) Assignee: AUDI AG, Ingolstadt (DE)

( * ) Notice: Subject to any disclaimer, the term of this patent is extended or adjusted under 35 U.S.C. 154(b) by 100 days.

(21) Appl. No.: 16/331,196

(22) PCT Filed: Oct. 11, 2017

(86) PCT No.: PCT/EP2017/001200
§ 371 (c)(1),
(2) Date: Mar. 7, 2019

(87) PCT Pub. No.: WO2018/068894
PCT Pub. Date: Apr. 19, 2018

(65) Prior Publication Data
US 2019/0256021 A1    Aug. 22, 2019

(30) Foreign Application Priority Data

Oct. 12, 2016 (DE) .......................... 10 2016 012 183

(51) Int. Cl.
*B60R 19/34* (2006.01)
*B62D 21/15* (2006.01)
*B62D 25/08* (2006.01)

(52) U.S. Cl.
CPC ............ *B60R 19/34* (2013.01); *B62D 21/152* (2013.01); *B62D 25/08* (2013.01)

(58) Field of Classification Search
CPC ... B60R 19/34; B60R 19/18; B60R 2019/247; B60R 21/34; B60R 2019/186; B62D 21/152; B62D 25/082
See application file for complete search history.

(56) References Cited

U.S. PATENT DOCUMENTS 7,284,788 B1 * 10/2007 Barbat .................... B60R 19/34
293/133
8,596,711 B2 * 12/2013 Yasui ...................... B60R 19/34
296/187.09

(Continued)

FOREIGN PATENT DOCUMENTS

DE    102013019522 A1    5/2015
DE    102014216478 A1    2/2016

(Continued)

OTHER PUBLICATIONS

International Preliminary Report on Patentability with translation of Written Opinion dated Apr. 25, 2019 in corresponding International Application No. PCT/EP2017/001200, 8 pages.

(Continued)

*Primary Examiner* — Kiran B Patel
(74) *Attorney, Agent, or Firm* — Maier & Maier, PLLC

(57) ABSTRACT

A crash structure for a vehicle, including a bumper crossmember of which the end portions are each connected to a corresponding longitudinal member via a crash box. End regions of the end portions each project in the vehicle transverse direction beyond the corresponding longitudinal member. In each case a first supporting element which protrudes in the direction of a corresponding wheelhouse is arranged at the end regions and, in an accident situation with slight overlapping of the other party in the accident, impinges on the corresponding longitudinal member. In each case a second supporting element is arranged at the end regions of the end portions and, in the accident situation with (Continued)

slight overlapping of the other party in the accident, impinges on a corresponding connecting region between the crash box and the longitudinal member.

10 Claims, 2 Drawing Sheets

(56) References Cited

U.S. PATENT DOCUMENTS

| | | | | |
|---|---|---|---|---|
| 8,985,671 B1* | 3/2015 | Lei | ............................ | B60R 19/04 |
| | | | | 296/133 |
| 8,991,903 B1* | 3/2015 | Alavandi | ................. | B60R 19/04 |
| | | | | 296/187.09 |
| 9,004,576 B2* | 4/2015 | Sakakibara | ........... | B62D 25/085 |
| | | | | 293/133 |
| 9,010,845 B1* | 4/2015 | Ramoutar | ................ | B60R 19/14 |
| | | | | 293/155 |
| 9,067,549 B2* | 6/2015 | Baccouche | ........... | B62D 21/152 |
| 9,199,591 B2* | 12/2015 | Weil | ......................... | B60R 19/34 |
| 9,242,673 B2* | 1/2016 | Okamoto | ................. | B60R 19/02 |
| 9,457,746 B1* | 10/2016 | Baccouche | ............... | B60R 19/34 |
| 9,481,334 B1* | 11/2016 | Matsumoto | ............. | B60R 19/34 |
| 9,550,463 B2* | 1/2017 | Hara | ........................ | B60R 19/34 |
| 9,555,754 B2* | 1/2017 | Hara | ..................... | B62D 21/152 |
| 9,555,756 B2* | 1/2017 | Sugano | .................... | B60R 19/04 |
| 9,676,353 B2* | 6/2017 | Sotoyama | ............ | B62D 21/152 |
| 9,884,600 B2* | 2/2018 | Fujimoto | ................. | B60R 19/44 |
| 9,908,560 B2* | 3/2018 | Nusier | .................. | B60R 19/023 |
| 9,925,937 B2* | 3/2018 | Watanabe | ............... | B62D 25/08 |
| 10,086,784 B2* | 10/2018 | Duffe | ....................... | B60R 19/04 |
| 10,239,559 B2* | 3/2019 | Leanza | .................... | B60R 19/24 |
| 10,279,841 B2* | 5/2019 | Ito | ......................... | B62D 21/152 |
| 10,464,609 B2* | 11/2019 | Ahmed | ................... | B60R 19/52 |
| 2009/0302591 A1* | 12/2009 | Auer | ..................... | B62D 21/152 |
| | | | | 280/784 |
| 2013/0241233 A1* | 9/2013 | Ohnaka | ................. | B62D 21/152 |
| | | | | 296/187.1 |
| 2013/0320709 A1* | 12/2013 | Kuwabara | ............. | B62D 25/082 |
| | | | | 296/187.09 |
| 2014/0008924 A1* | 1/2014 | Han | ......................... | B60R 19/18 |
| | | | | 293/133 |
| 2014/0062106 A1* | 3/2014 | Han | ......................... | B60R 19/34 |
| | | | | 293/133 |
| 2014/0091585 A1* | 4/2014 | Ramoutar | ................ | B60R 19/24 |
| | | | | 293/133 |
| 2014/0091595 A1* | 4/2014 | Ramoutar | ................ | B60R 19/24 |
| | | | | 296/187.09 |
| 2014/0361561 A1* | 12/2014 | Kuriyama | ............. | B62D 25/082 |
| | | | | 293/133 |
| 2015/0021936 A1* | 1/2015 | Nusier | .................. | B62D 21/152 |
| | | | | 293/114 |
| 2015/0102635 A1* | 4/2015 | Barbat | .................. | B62D 21/152 |
| | | | | 296/187.1 |
| 2015/0137556 A1* | 5/2015 | Alavandi | ................. | B60R 19/16 |
| | | | | 296/187.1 |
| 2015/0158441 A1* | 6/2015 | Nusier | .................. | B62D 21/152 |
| | | | | 293/133 |
| 2015/0183468 A1* | 7/2015 | Shirooka | ............... | B62D 21/155 |
| | | | | 296/187.1 |
| 2015/0274209 A1* | 10/2015 | Basappa | .................. | B60R 19/04 |
| | | | | 180/271 |
| 2015/0314742 A1* | 11/2015 | Kato | ........................ | B60R 19/34 |
| | | | | 293/155 |
| 2016/0101751 A1* | 4/2016 | Bou | .......................... | B60R 19/04 |
| | | | | 293/133 |
| 2016/0152201 A1* | 6/2016 | Ramoutar | ................ | B60R 19/24 |
| | | | | 296/187.1 |
| 2016/0318552 A1* | 11/2016 | Matsumoto | ........... | B62D 25/082 |
| 2017/0036699 A1* | 2/2017 | Asai | ...................... | B62D 25/082 |
| 2017/0274851 A1* | 9/2017 | Schneider | ............... | B60R 19/24 |

FOREIGN PATENT DOCUMENTS

| | | |
|---|---|---|
| DE | 102014223633 A1 | 5/2016 |
| EP | 3006311 A1 | 4/2016 |
| WO | 2015/019167 A1 | 2/2015 |

OTHER PUBLICATIONS

German Examination Report dated Jul. 14, 2017 in corresponding German Application No. 102016012183.1; 23 pages.

International Search Report and Written Opinion dated Jan. 24, 2018 in corresponding International Application PCT/EP2017/001200; 33 pages.

* cited by examiner

US 10,843,648 B2

CRASH STRUCTURE FOR A VEHICLE

FIELD

The invention relates to a crash structure for a vehicle.

BACKGROUND

Crash structures for vehicles in numerous variations are known and are used for absorbing forces occurring in an accident. In an accident in which the parties in the accident overlap 100% to 30% over one another, the occurring forces can be absorbed, for example, via the bumper crossmember, crash boxes and longitudinal members or rocker panel structures of the struck vehicle by deformation of these structures. In addition, it is known that the end regions of the bumper crossmember project beyond the corresponding longitudinal members in the vehicle transverse direction. At these end regions, a first supporting element protruding in the direction of a corresponding wheelhouse can be arranged, respectively. In the case of an accident with slight overlapping of the other party in the accident, for example, in the case of a 25% overlapping, the first supporting element impinges on the corresponding longitudinal member. Due to a positive connection between the supporting element and the longitudinal member, energy from the accident can be transmitted to the longitudinal member and thereby can be dissipated at least partially.

From DE 10 2014 216 478 A1, a crash structure for a vehicle according to the preamble is known, which comprises a longitudinal member arrangement, a bumper crossmember and a supporting element. The bumper crossmember is fastened at one end of the longitudinal member arrangement, and an end portion of the bumper crossmember protrudes in the transverse direction beyond the longitudinal member arrangement. The supporting element is fastened at the end portion of the bumper crossmember and extends over a predetermined length in the vehicle longitudinal direction toward the rear. Preferably, the supporting element extends substantially parallel to the longitudinal member arrangement. The supporting element is arranged or designed at a predetermined distance from the longitudinal member arrangement. In addition, the supporting element is designed and arranged in such a manner that, in the case of a deformation of the end portion of the bumper crossmember due to a collision with slight overlapping of the other party in the accident, it braces the end portion on the longitudinal member arrangement. Due to the bracing of the end portion, an additional deformation of the end portion of the bumper crossmember in the direction of the longitudinal member arrangement is inhibited.

DE 10 2013 019 522 A1 discloses a vehicle body which comprises a crossmember in at least one longitudinal member. On the at least one longitudinal member, means for absorbing collision energy are provided, which, in the case of a collision with slight overlapping of the other party in the accident, selectively ensure the introduction of the load path into the at least one longitudinal member.

SUMMARY

The object of the invention is to provide a crash structure for a vehicle, which exhibits improved crash behavior in accidents with slight overlapping of the other party in the accident.

In order to provide a crash structure for a vehicle, which has improved crash behavior in accidents with slight overlapping of the other party in the accident, a second supporting element is arranged at end regions of end portions of a bumper crossmember, respectively, and, in an accident situation with slight overlapping of the other party in the accident, impinges on a corresponding connection region between a crash box and a longitudinal member.

Below, a crash structure is understood to mean a subassembly comprising at least one bumper crossmember, two crash boxes and two longitudinal members. The bumper crossmember has a center portion which is arranged between the two longitudinal members. In addition, the bumper crossmember comprises two end portions which are connected via the crash box arranged in this portion to the corresponding longitudinal member, respectively. In addition, the end portions have end regions on which the supporting elements are arranged. The bumper crossmember can be arranged on a vehicle front and/or on a vehicle rear.

In an accident with slight overlapping of the other party in the accident, the respective end portion of the bumper crossmember can be deformed by the acting forces and/or energies. Advantageously, the two corresponding supporting elements are moved with the end portion of the bumper crossmember in the direction of the respective longitudinal member and they impinge on the longitudinal member in two different impact regions. Advantageously, the two supporting elements can mesh with a longitudinal member and in the process brace the end portion of the bumper crossmember on the longitudinal member. Advantageously, acting forces at the two impact areas can be introduced via the supporting elements into the respective longitudinal member. Furthermore, an additional movement of the end portion in the direction of a vehicle interior can be impeded or completely prevented by the bracing effect of the supporting elements. Thereby, a sliding of the vehicle off the other party in the accident can be achieved and an overlapping of the other party in the accident in the vehicle transverse direction can be advantageously reduced. In addition, due to the vehicle's sliding off of, an introduction of the acting forces and/or energies into a corresponding wheelhouse can at least be impeded and a structural integrity of the wheelhouse can be maintained. Moreover, a deformation of other elements in this region, such as, for example, a stone deflector of the bumper, can be reduced or completely prevented.

In an advantageous design of the crash structure according to the invention, the second supporting element can be designed to be shorter than the first supporting element. In addition, the second supporting element can be arranged between a connection arrangement of the crash box and the first supporting element. Advantageously, the shorter internal second supporting element forms an inner bracing and the outer longer supporting element forms an outer bracing of the end portion. Due to the dimensions, the supporting elements can predetermine a distance of the end portion to the longitudinal member. In addition, due to the dimensions of the supporting elements, an overlapping of the wheelhouse by the end portion can be predetermined, thereby preventing or at least impeding a penetration of the other party in the accident into the wheelhouse. Moreover, due to the dimensions of the end portions, positions of impingement of the two supporting elements on the longitudinal member can be predetermined.

In another advantageous design of the crash structure according to the invention, the second supporting element can catch on an impact plate of the crash box and deform the longitudinal member in the vehicle longitudinal direction. Advantageously, acting forces and/or energies can be introduced into the longitudinal member, so that the longitudinal member, in an accident with slight overlapping of the other party in the accident, is included in the load path. Here, the longitudinal member can be compressed in the longitudinal direction and deformed toward the vehicle center. Thereby, the longitudinal member can advantageously lock toward the engine unit or the side facing away from the impact and in this way generate high transverse forces which can lead to the partial sliding off of the vehicle.

In another advantageous design of the crash structure according to the invention, the first supporting element can impinge laterally on the longitudinal member and deform said member in the vehicle transverse direction. Advantageously, due to the introduction of forces and/or energies in the vehicle transverse direction, the heavy vehicle power unit or other suitable components can also be used for the energy and/or force dissipation. In addition, the acting forces and/or energies can be led away from the vehicle interior in the vehicle transverse direction. In the process, a load onto the A-pillar can also be advantageously reduced and thereby the structural integrity of the vehicle can be improved.

In another advantageous design of the crash structure according to the invention, at least one of the two supporting elements can be designed to form a single piece with the end region of the bumper crossmember. In addition, the end regions or end portions of the bumper crossmember can be designed to form a single piece with the center portion of the bumper crossmember. Thus, the end portions can be formed, for example, on the center portion. Alternatively, the bumper crossmember can be designed in several parts, wherein the end portions can be connected to the center portion, for example, via screw connections. In addition, the at least one supporting element and the end portions as well as the center portion in each case can be designed as an extruded profile. Extruded profiles are advantageously stable and can be produced simply and cost effectively.

In another advantageous design of the crash structure according to the invention, at least one of the two supporting elements can be designed to be wedge shaped. Advantageously, a wedge shape with a tapering end region facing the longitudinal member enables a simple catching on at the longitudinal member.

BRIEF DESCRIPTION OF THE DRAWINGS

An embodiment example of the invention is represented in the drawing and explained in further detail in the following description. In the drawing, identical reference numerals designate components or elements which implement identical or analogous functions. Here, the drawings show.

DETAILED DESCRIPTION

Figure 1:
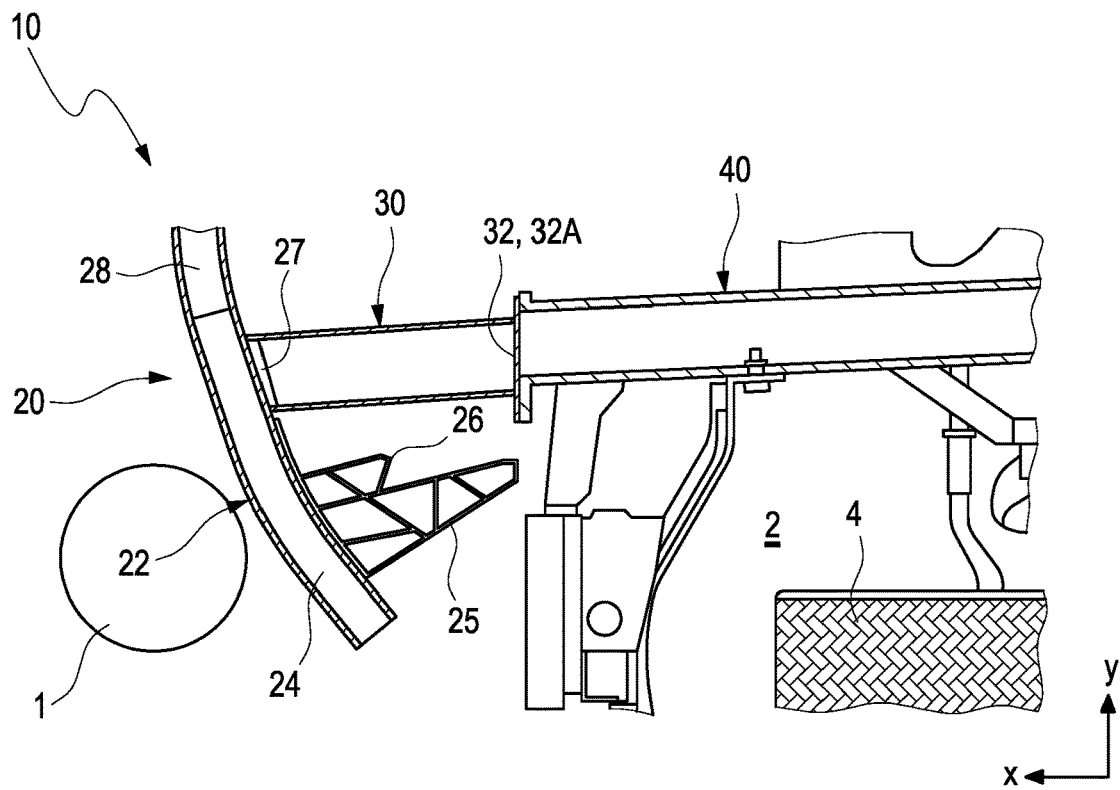
FIG. 1 a diagrammatic representation of a lower section of an embodiment example of a crash structure according to the invention for a vehicle in a starting position, FIG. 2 a diagrammatic representation of the lower section of the crash structure according to the invention from FIG. 1 at the time of the impact of another party in an accident, and FIG. 3 a diagrammatic representation of an upper section of the crash structure according to the invention from FIGS. 1 and 2.
Figure 2:
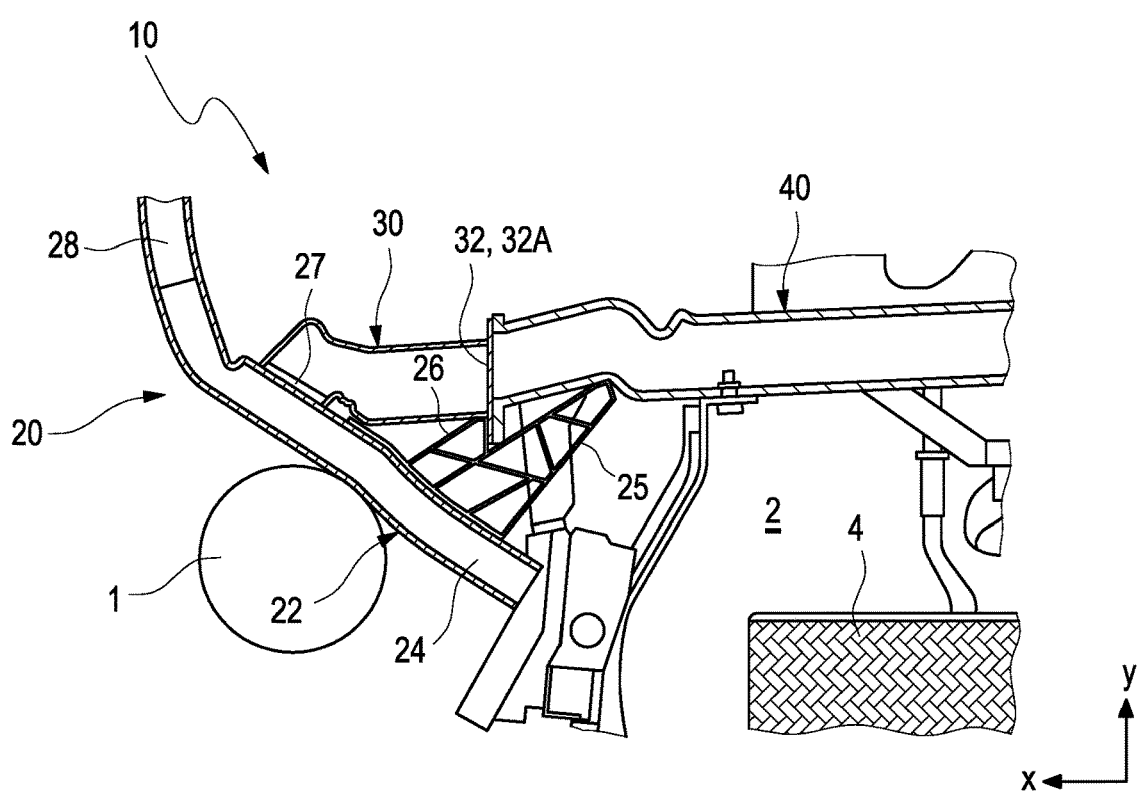
Figure 3:
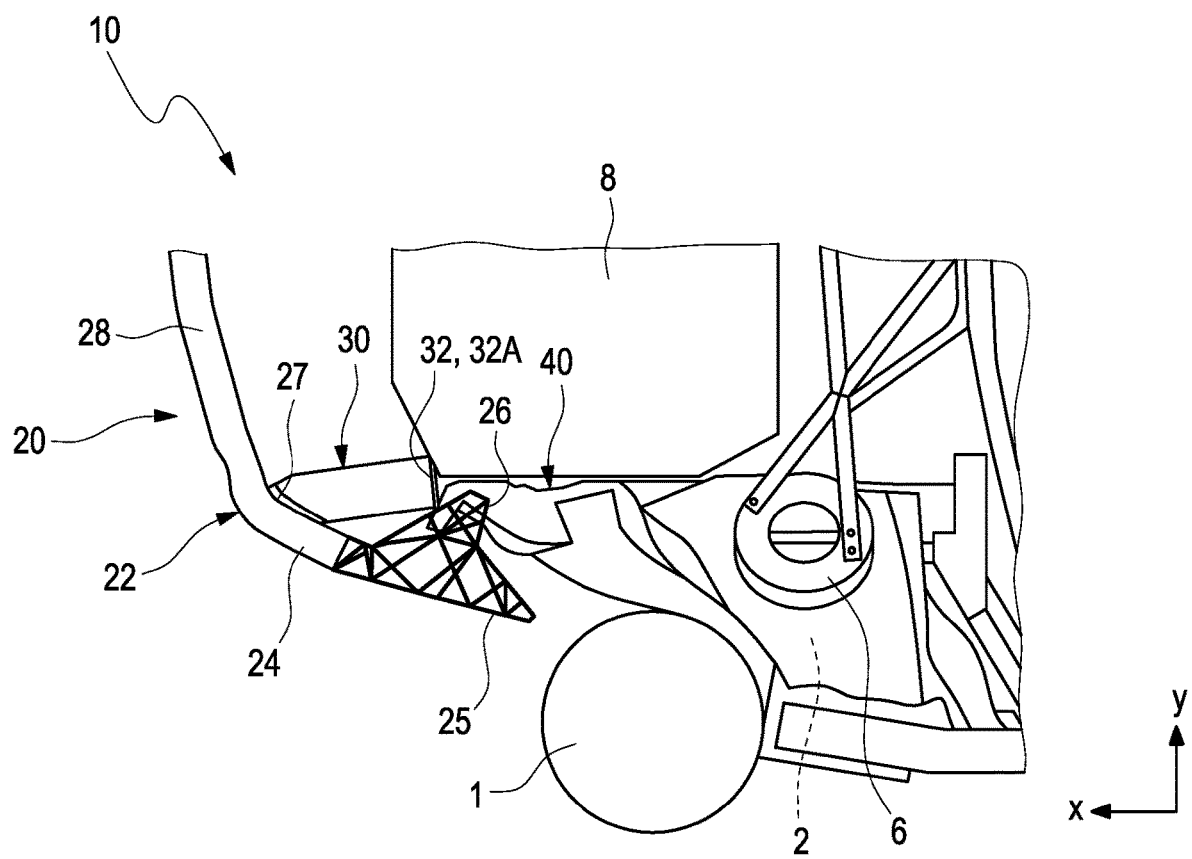

As can be seen in FIGS. 1 to 3, a crash structure 10 for a vehicle in the represented embodiment example comprises a bumper crossmember 20 of which the end portions 22 are each connected to a corresponding longitudinal member 40 via a crash box 30. The end regions 24 of the end portions 22 each project in the vehicle transverse direction y beyond the corresponding longitudinal member 40. In each case, a first supporting element 25 which protrudes in the direction of a corresponding wheelhouse 2 is arranged at the end regions 24 of the end portions 22 and, in an accident situation with slight overlapping of the other party in the accident, impinges on the longitudinal member 40.

According to the invention, in each case a second supporting element 26 is arranged at the end regions 24 of the end portions 22 and, in the accident situation with slight overlapping of the other party in the accident, impinges on a corresponding connection region 32 between the crash box 30 and the respective longitudinal member 40.

As can also be seen from FIGS. 1 to 3, only one crash structure 10 according to the invention, which is on the left section in the driving direction, is represented. The crash structure 10 comprises, on a vehicle front, two longitudinal members 40, two crash boxes 30 and the front bumper crossmember 20 which comprises a center portion 28 and two end portions 22. In FIGS. 1 to 3, only a portion of the center portion 28 and an end portion 22 of the bumper crossmember 20 to the left of the direction of travel, is represented. The center portion 28 is arranged between the connection arrangement 27 of the crash boxes 30. The longitudinal members 40 extend in the vehicle longitudinal direction x and are connected at a front end-region to the crash boxes 30, respectively.

In an accident with sufficient overlapping of the other party in the accident, the impinging forces can be absorbed, for example, via the bumper crossmember 20, the crash boxes 30 and the longitudinal members 40 of the impacted vehicle by deformation of these structures 20, 30, 40. In an accident with sufficient overlapping, another party to the accident 1 impinges centrally or slightly offset from the center on the bumper crossmember 20. The bumper crossmember 20 transfers the acting forces and/or energies onto the structures arranged behind, for example, to the crash boxes 30 and the longitudinal members 40. In the case of an accident with slight overlapping, the other party in the accident 1 is only impinged by the bumper crossmember 20 at one of its two end portions 22 or at a corresponding end region 24 of the end portion 22, as represented in FIGS. 2 and 3.

As can be seen from FIGS. 1 to 3, the second supporting element 26 is designed to be shorter than the first supporting element 25. In addition, the second supporting element 26 is arranged between the connection arrangement 27 of the crash box 30 and the first supporting element 25.

As can be seen furthermore from FIGS. 2 and 3, the respective end portion 22 of the bumper crossmember 20 undergoes a deformation at the time of the impact of the other party in the accident 1. Thereby, the two supporting elements 25, 26 are moved by the acting forces and/or energies in the direction of the longitudinal member 40. Here, the second supporting element 26 catches on an impact plate 32A of the crash box 30 and deforms the longitudinal member 40 in the vehicle longitudinal direction x. Thereby, the longitudinal member 40 is compressed. The first supporting element 25 simultaneously laterally impinges on the longitudinal member 40 and deforms it in the vehicle transverse direction y. In the process, the longitudinal member 40 is pressed in the direction of an engine unit 8 represented in FIG. 3. Thereby, acting forces and/or energies are introduced into the longitudinal member 40 both in the vehicle longitudinal direction x and in the vehicle transverse direction y. In addition, the supporting elements 25, 26 and the longitudinal member 40 lock to the engine unit 8 and enable the buildup of high transverse forces which can lead to a partial sliding off of the vehicle. Via the engine unit 8, the acting forces and/or energies can be transmitted to a side facing away from the impact in order to dissipate additional acting forces and/or energies. In addition or alternatively, the acting forces and/or energies can also be introduced into other suitable subassemblies or components or units which are not represented in further detail, in order to enable the partial sliding off of the vehicle or the distribution of forces and/or energies or the dissipation of forces and/or energies. Due to the partial sliding off of the vehicle, the other party in the accident 1 moreover impinges on the outside on the vehicle and can slide past a wheelhouse 2, so that less energy and/or force is transmitted to a wheel 4 arranged in the wheelhouse 2 or to a shock absorber accommodation 6 arranged above the wheelhouse 2. Thereby, acting forces and/or energies can be led outward away from the wheelhouse 2 and not reach the vehicle interior, resulting in improved occupant protection.

Moreover, as can be seen from FIGS. 1 to 3, in the represented embodiment example of the crash structure 10 according to the invention, the supporting elements 25, 26 are designed to form a single piece with the end region 24 of the bumper crossmember 20. Alternatively, only one or none of the two supporting elements 25, 26 can be designed to form a single piece with the end region 24.

Moreover, as can be seen from FIGS. 1 to 3, in the represented embodiment example of the crash structure 10 according to the invention, the end portions 22 of the bumper crossmember 20 are formed on the center portion 28 of the bumper crossmember 20. This means that the end portions 22 and the center portion 28 of the bumper crossmember 20 are designed to form a single piece. Alternatively, the bumper crossmember 20 can be designed in several parts. This means that the end portions 22 can be connected, for example, via screw connections to the center portion 28.

Moreover, as can be seen from FIGS. 1 to 3, the two supporting elements 25, 26, the end portion 22 and the center portion 28 are implemented as extruded profiles. Alternatively, the supporting elements 25, 26 or the end portions 22 or the center portion 28 can be produced from other suitable materials by suitable production methods.

Moreover, as can be seen from FIGS. 1 to 3, in the represented embodiment example, the two supporting elements 25, 26 are each designed in the shape of a wedge. In an alternative embodiment example which is not represented, the supporting elements 25, 26 can also have other suitable shapes. In addition, the two supporting elements 25, 26 can have different shapes.

The invention claimed is:

1. A crash structure for a vehicle, comprising:
a bumper crossmember the end portions of which are each connected to a corresponding longitudinal member via a crash box, wherein end regions of the end portions each project in the vehicle transverse direction beyond the corresponding longitudinal member, wherein, in each case, a first supporting element which protrudes in the direction of a corresponding wheelhouse is arranged at the end regions and, in an accident situation with slight overlapping of the other party in the accident, impinges on the corresponding longitudinal member, characterized in that, in each case, a second supporting element is arranged at the end regions of the end portions and, in the accident situation with slight overlapping of the other party in the accident, impinges on a corresponding connecting region between the crash box and the longitudinal member.

2. The crash structure according to claim 1, wherein the second supporting element is designed to be shorter than the first supporting element.

3. The crash structure according to claim 1, wherein the second supporting element is arranged between a connection arrangement of the crash box and the first supporting element.

4. The crash structure according to claim 1, wherein the second supporting element catches on an impact plate of the crash box and deforms the longitudinal member in the vehicle longitudinal direction.

5. The crash structure according to claim 1, wherein the first supporting element impinges laterally on the longitudinal member and deforms it in the vehicle transverse direction.

6. The crash structure according to claim 1, wherein at least one of the two supporting elements is designed to form a single piece with the end region of the bumper crossmember.

7. The crash structure according to claim 1, wherein the end portions of the bumper crossmember are designed to form a single piece with a center portion of the bumper crossmember.

8. The crash structure according to claim 1, wherein the bumper crossmember is designed of several parts, wherein the end portions are connected to the center portion.

9. The crash structure according to claim 1, wherein at least one of the two supporting elements and/or the end portions of the bumper crossmember and/or the center portion of the bumper crossmember is/are designed as extruded profiles.

10. The crash structure according to claim 1, wherein at least one of the two supporting elements is designed to be wedge-shaped.

\* \* \* \* \*